United States Patent
Laplume

[15] 3,665,615
[45] May 30, 1972

[54] TEACHING MACHINE IN WHICH INSTRUCTION ITEMS ARE PROJECTED BY AN IMAGE PROJECTOR

[72] Inventor: Jacques Laplume, Gif-Sur-Yvette, France

[73] Assignee: Societe D'Etudes Techniques et D'Entreprises Generales (SODETEG), Le Plessis-Robinson, France

[22] Filed: Sept. 4, 1970

[21] Appl. No.: 69,739

[30] Foreign Application Priority Data

Sept. 9, 1969 France......................6930552

[52] U.S. Cl. ..................................................35/9 A
[51] Int. Cl. ..............................................G09b 7/08
[58] Field of Search..............................35/9 A, 9 C

[56] References Cited

UNITED STATES PATENTS

| | | | |
|---|---|---|---|
| 3,277,588 | 10/1966 | Lynott et al. | 35/9 A |
| 3,355,818 | 12/1967 | Whitehorn | 35/9 A |
| 3,386,187 | 6/1968 | Kilby | 35/9 A |
| 3,497,966 | 3/1970 | Gaven | 35/9 A |

*Primary Examiner*—Wm. H. Grieb
*Attorney*—Flynn & Frishauf

[57] ABSTRACT

A strip film, carrying instruction items and questions with response indications thereon, and additionally, coded response code tracks (which are blocked from view of the student) is projected on a screen; the student is provided with a pointer having a photosensitive end, responding to the response items. A movable mask scans across both the response items and the response code track, and electrooptical transducers transmit the pulses upon scanning of a code position on this code track and the pulse from the photosensitive end to a logic circuit, which determines which code track has time-coincidence with the pulse from the photosensitive end. Subsequent indexing of the film to further instruction items (which may be entirely new instruction items or sub-items in further explanation in case the answer was wrong) is then controlled by the logic circuit decoding the coincidence of indication from a particular track and the photosensitive end.

14 Claims, 7 Drawing Figures

TEACHING MACHINE IN WHICH INSTRUCTION ITEMS ARE PROJECTED BY AN IMAGE PROJECTOR

Cross reference to related applications:

| U.S. Ser. No. | Filing Date | Now Patent No. |
|---|---|---|
| 832,290 | June 11, 1969 | 3,623,238 |
| 880,144 | Nov. 26, 1969 | |

The present invention relates to teaching machines and more particularly to teaching machines in which instruction items are projected by means of an image projector, such as a film strip projector and projecting, for instruction purposes, instruction items such as text material, figures, and the like, coded on a film, on a screen for presentation to a student.

Teaching machines of the type to which the present invention relates provide programmed instruction items which are presented to one or more students. The instruction items may contain text material, drawings or figures, and the like. Each instruction item should be complete in itself and made a definite pedagogical point which invites the students to reflect and ponder, and then answer questions which are listed and referred to hereinafter as "response items". The questions should be so phrased that they permit a judgment to made regarding comprehension of the instruction item by the student. The response items are preferably of the "multiple choice" type and so presented that they offer a student an opportunity to select among various responses to one which is most appropriate. The choice of the responses is indicated by the student by means of a device placed at his disposal; such a device may, for example, by a keyboard, or, for example, a pointer which the student points to a spot on the item which is presented to him and which the student believes is the correct one; or, another analogous and similar device may be used to translate the student's response into "machine language" which can be accepted by automatic, electronic equipment. The machine itself is programmed to detect whether the answer proposed by the student is correct, or false. In case the answer is correct, the subsequent instruction item is automatically presented to the student, together with a series of questions testing the comprehension of the next instruction item. If, however, the answer supplied by the student to any instruction item is incorrect, the machine presents a subsequent sub-instruction item to the student which provides more detail explanations regarding the material presented by the preceding main instruction item, in order to guide or lead the student to answer correctly to the questions posed thereafter. These sub-instruction items need be of variable number and need be placed in different manners between the items, in accordance with the type of teaching machine under consideration. In a general way, and when located on paper tapes, they are frequently placed between successive main instruction items.

Paper tapes, and other sequential tapes usually carry on a portion of the tape prevented from access by the student the correct answer to the question, this answer being in the form of a code, and an auxiliary device placed at the student's disposal to deliver an answer in a similar code. The written response, that is the read-in response into the teaching machine and the response previously recorded on the tape or band are then compared in certain logic circuits to determine coincidence, indicative of a correct answer, or non-coincidence indicative of a wrong answer.

Teaching machines of this type may have various differences among each other and specifically by the means placed at the disposal of the student in order to convert his answer into "machine readable language" so that the reply intended by the student can be electronically recorded.

In teaching machines in which the student is provided with a keyboard, similar to that of a typewriter keyboard, for example, each key may be assigned a certain symbol or a number in particular order. This system, if a full complete alphanumeric typewriter-type keyboard is used may be quite complicated. Smaller keyboards may require special construction. It has thus already been proposed to utilize a pointed element which is placed in selected holes in order to indicate a specific answer, placement of a pointer in a specific socket completing the continuity of an electric circuit, so that information is obtained which can afterwards be processed to determine if the answer is correct or wrong, and thereby control the subsequent functioning and operation of the machine. Other pointers similar to photostylii have been suggested, require, however, presentation of the instruction item on a television-type screen which is a complicated and quite costly solution, particularly with a large number of teaching positions to be filled.

It is therefore an object of the present invention to provide a means for the student to indicate the particularly selected response which is simple, can be used by various students, and can be inexpensively instrumented.

Subject matter of the present invention

In accordance with the present invention, images corresponding to items and sub-items of instructional items are located one after the other in sequential frames on a film, the sub-items being located between successive main instruction items. The different images carrying the instruction items are projected on a screen, successively, in accordance with indexing of the film. Each image presents, in the portion visible to the student, besides the instruction items questions, free, clear spots which correspond, on the portion film hidden from view of the student, to equal clear spots placed on parallel tracks extending in the direction of indexing of the film.

The student is invited to selected the one or the other of the response items by placing a pointer with a photosensitive end piece on the screen at the point of the bright spot indicative of a selected response item, which action triggers operation of a mask successively and briefly blocking the bright spots of the response items on the film, as well as the spots on the code track, to obtain output pulses from the photosensitive end of the pointer, as well as from optical-electric transducers located in light-receiving relationship with respect to the response code tracks. Of course, rather than blocking a light path, a previously blocked opaque area may be illuminated and pulses indicative of brief light reception, rather than brief darkening may be utilized.

The photoelectric transducers located in light-receiving relation with respect to the coded tracks deliver pulses when the specific spot corresponding to a response item is darkened by the mask. Logic circuits then decode the information obtained from the coincidence of pulses from the photoelectric transducers and those obtained from the photosensitive end of the pointer, placed by the student on a selected response item to obtain a coicidence which will be characteristic of the moment, in time, when the luminous flux changes, due to the darkening of the spot on the response item. If the response item corresponding to the correct answer has been indicated, then the maximum number of instruction items on the film will be indexed; if a different response has, however, been recorded, then an instruction item giving further explanation to correct, and further amplify the understanding of the student can be presented.

The invention will be described by way of example with reference to the accompanying drawings, wherein.

Figure 1:
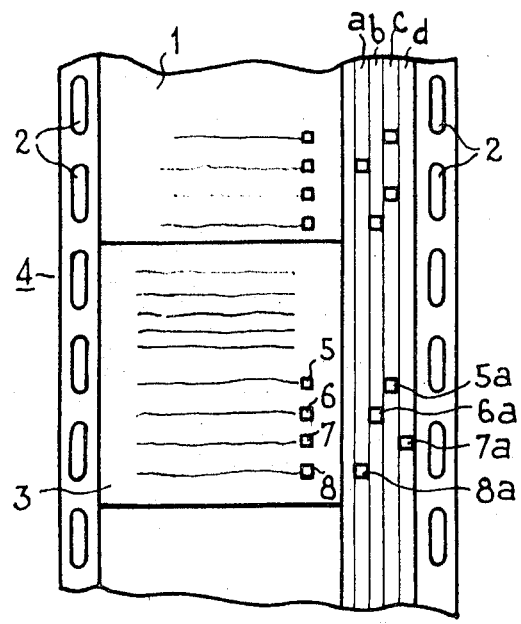
FIG. 1 is a fragmentary plan view of the film.

The film 1 has lateral perforations 2 to locate the film, properly framed, in a projector, as is well known. One of the edges of the film is formed with longitudinal tracks a,b,c,d,... for example four, as illustrated in FIG. 1. The number of these tracks should correspond to the largest number of sub-instruction items intended to be used in the particular instruction program.

Figure 2:
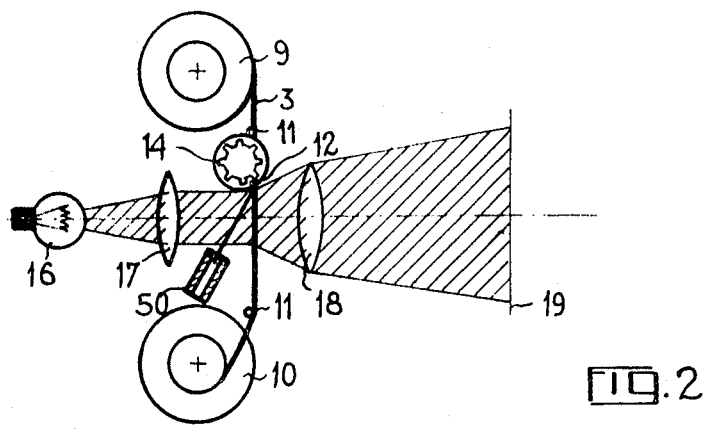
FIG. 2 is a schematic side view of the projection system.
Figure 3:
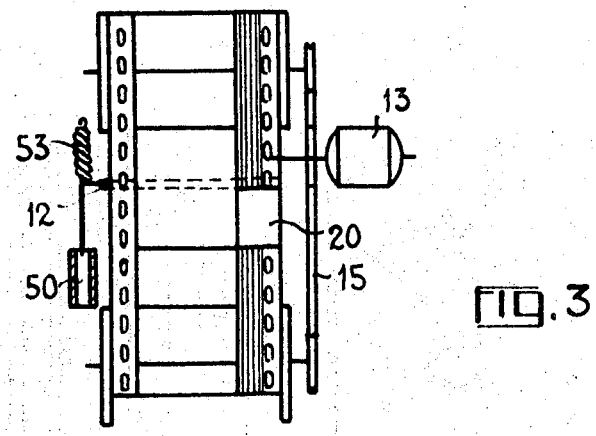
FIG. 3 is a schematic plan view of the film and the projection system and illustrating the film reading.
Figure 4:
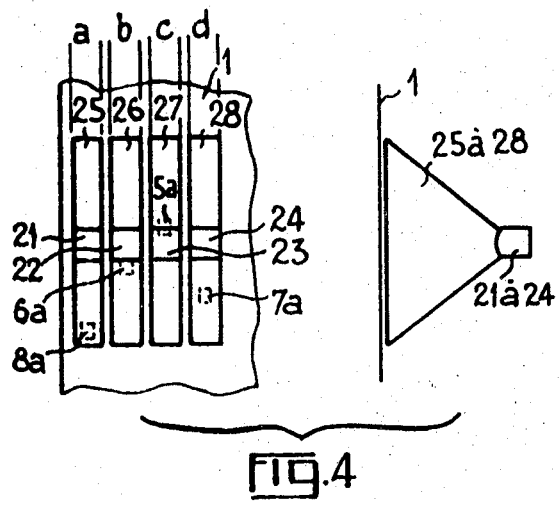
FIG. 4 is a detailed view of the optical reader of FIG. 3.

Each one of the complete instruction items carries a text 4 which may, for example, be additionally illustrated by drawings, figures and the like. Each one of the text items 4 is followed by one or more questions. The answers to the questions for example in the form of "multiple choice" are represented by blank spots 5, 6, 7, 8. These spots need not necessarily be located one underneath the other; the only requirement is that they are off set, or spaced, with respect to each other in the sense of indexing or movement of the film, or, in other words, present sequentially, with respect to an end of the film different longitudinal dimensions. Each one of the spots 5–8, and at the same horizontal alignment, has a corresponding bright or clear spot 5a, 6a, 7a, and 8a, each one located on one of the tracks a–d. The tracks a–d, and therefore the spots 5a–8a are blanked from view of the student. FIGS. 2 and 3 illustrate, in schematic form, the image projection system. A strip film 3 rolled on spools 9, 10 and guided by idlers 11 is moved by motor 13 driving a sprocket 14. Movement of the motor is likewise applied to the spools 9, 10 by means of a drive 15, which always maintains the film in proper tension. The optical system of the projector is formed by a lamp 16, a condenser 17, a projection lens 18 and a screen 19. To these elements, all well known by themselves, is added an optical-electrical transducer assembly formed of photoelectric devices generally indicated at 20, and a mask, or blocking element 12. The optical-electrical transducer assembly, seen in more detail in FIG. 4, is formed of as many photoelectric transducer cells 21, 22, 23, 24 as there are tracks a, b, c, d, that is, in the selected example there will be four photosensitive cells. Each one of the photosensitive cells receives light from the bright spots 5a–8a located on a corresponding track. So that the photoelectric cells may receive the light from a spot regardless of its position on the track, within a frame, light conduits 25–28 are provided; these light conduits may be mirror assemblies, prisms, or lenses, or any other equivalent optical device. These devices can be interposed between the photosensitive cells and the film if the photosensitive surface does not cover the entire height of a frame, or that portion which carries the bright spots 5a–8a. Light guides, or similar elements may be used, for example particularly as shown at the right hand side of FIG. 4. Thus, if a frame is correctly centered, the photosensitive cells 21–24 are permanently excited by the light which traverses the bright spots 5a–8a. The entire assembly of cells is covered by a housing to afford mechanical protection and to prevent projection of the tracks on the screen 19, so that the position of the coded response spots 5a–8a will be blocked from view of the student. The student may thus only see the instruction item, and, as illuminated bright spots on the screen, the spots 5–8 following the various questions.

Figure 5:
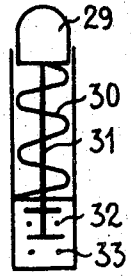
FIG. 5 is a schematic cross sectional view of the pointer with a photosensitive end, to be used by the student.

As previously mentioned, the student indicates his response by means of a pointer applied to one or the other of the luminous bright spots 5–8. The end of the pointer (FIG. 5) is provided with a photosensitive cell 29 which, upon its application on the screen, depresses spring 30 to cause closing of contacts 32, 33 by means of push button 31. Closing of contact 33 connects the pointer, and particularly photosensitive end 29 into electric circuits, or establishes its interconnection with the output. Other, manually controlled switches can be used. As soon as the pointer is excited by the light of a bright spot, it will supply an output voltage. The closure of the contact 33 places an electromagnet 50 (FIGS. 2, 3) into circuit, which operates a plunger, causing rapid vertical displacement of a mask, or blocking element 12 extending across the image, the blocking element 12 traveling along the length of the film. The blocking element or mask 12 may, for example, be simply an opaque rod, or it may be a transparent strip on which an opaque trace has been placed. The mask should be just slightly greater than the height of the spots 5, or 5a. Upon movement of the mask, it will partially interrupt the light emanating from lamp 16 and lens 17. The spots 5–8, as well as the spots 5a–8a will thus briefly be masked. At the moment of blocking, the current applied by the photocells 21–24, as well as the current applied from the photocell 29 at the photosensitive end of the pointer (FIG. 5) will fall to zero or null, and then, after passage of the mask, will again take its initial value. This sudden drop provides a pulse which, upon application to a logic circuit, causes indexing of the film and recording of the answer, and its type, that is whether it is correct or wrong.

Let one, for example, suppose that the pointer is placed at the spot 8 (FIG. 1). The pulse from photocell 29 will thus occur at the same time as the extinction of the spot 8a, which, as has been noted, is placed in the first track a on film 1. Thus, the outputs from photocells 21, and 29 will be simultaneous. If, on the other hand, the student has placed the pointer at the spot 7, a coincidence of pulses will be obtained from photocell 24, assigned to track d, as well as photocell 29.

Figure 6:
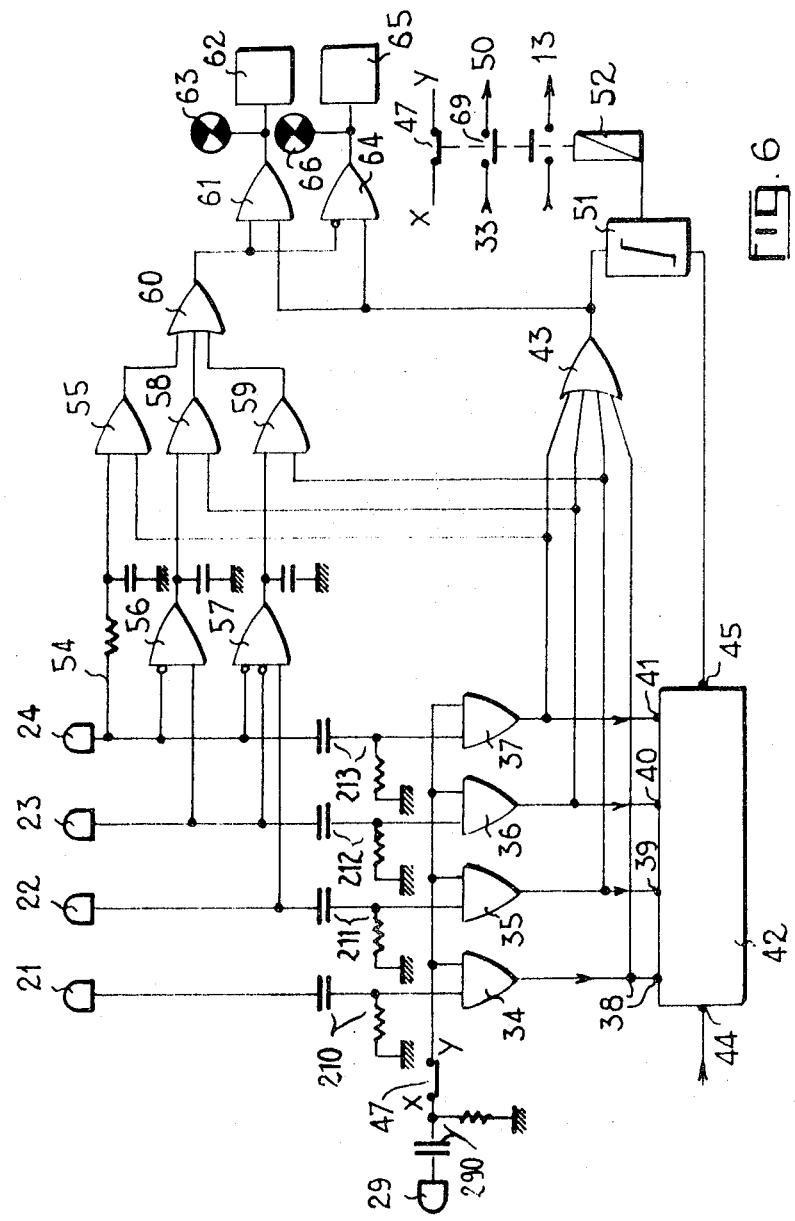
FIG. 6 is a schematic circuit diagram of a logic circuit to process the information obtained from the photoelectric transducers of FIG. 4, and the pointer of FIG. 5.

The information obtained from the simultaneous occurrence of a pulse from photocell 29, that is from the pointer, and the specific track having a spot aligned with one on which the pointer has been placed is then processed in a logic circuit, as illustrated schematically in FIG. 6. The logic circuit of FIG. 6 determines if the answer is correct or wrong, and controls a sequence of operations in accordance with the result obtained.

A correct answer will result in indexing of film by a maximum number of frames, since further explanatory sub-items need not be projected to the student; on the other hand, an indication that a wrong answer has been furnished, and, further, which one of the wrong answers causes indexing of the film in accordance with a different pattern. These further explanatory sub-items are inserted between consecutive main instruction items.

Pulses applied by photocells 21–24, shown schematically in FIG. 6, as well as photocell 29 (shown at the left of FIG. 6) are transmitted to a group of AND circuits 34–37 over differentiating circuits 210–213, as well as 290, which permit the passage of pulses but which block d-c components. Coincidence between pulses from pointer cell 29 and from cell 21 enables AND circuit 34, which applies an output to a terminal 38 of a preset counter 42 applying a pulse to counter 42 at terminal 38 and causes the counter to supply an output of 1; at 39, an output of two, at 40, an output of three, and at terminal 41, an output of four. At the same time, an output from any one of the AND gates 34–37 is applied to OR gate 43, which causes bistable circuit 51, for example, an ordinary flipflop, to trigger and to switch state, exciting a relay 52 and starting motor 13.

Each time that film 1 has passed a frame, a mechanical device connected to the sprocket 14, and not shown in FIG. 2, provides a pulse which is applied to an input 44 of counter 42, to reset the counter by one count. When the counter has reached zero, output from terminal 45 resets flipflop 51 to change it to the ZERO state, thus dropping out relay 52 and stopping motor 13.

Coincidence between pulses from photocells 29 and 21 positions the counter 42 to a count of one, and movement of the film will thus stop after one frame. If, for example, the student has designated with his pointer not the response item 8, but rather the response item 7, then coincidence between pulses the cell 29 in the pointer, and the cell 24 would have been detected, enabling AND gate 37, causing indexing of the film by four frames. During movement of the film, an auxiliary contact 47 of the relay controlling operation of the motor is opened to cut the connection between the photosensitive cell 29 of the pointer and the AND gates 34–37, in order to avoid recording of parasitic signals which occur during rapid passing of the spots 5–7 under the pointer if it continues to be applied to the screen.

The position of the bright spots 5a–8a along the length of the tracks a–d is predetermined for each image frame in such a manner that the machine will automatically present appropriate instruction item, be it the main, or a subsidiary instruction item, as determined by the answer designated by the student. For example, in the embodiment described in connection with the present invention, the correct answer corresponds to spot 7, producing the maximum indexing of frames, that is, presentation of the next main instruction item and no subsidiary instruction items.

If the student tries to designate an image point which has no horizontal alignment with one of the spots 5a–8a, or, which is saying the same thing, between 5 and 8, then the logic circuit will not detect any coincidence, circuit 43 will not supply any output signals and the motor 13 will not start.

As soon as the motor starts under control of relay 52, the mask 12 is returned to its initial position by spring 53. This can easily be obtained, for example, as shown in FIG. 6 by interrupting continuity of the circuit to electromagnet 50 by interconnecting contacts 69 between the connection from contact 33 and solenoid 50, that is, by adding another group of contacts to the contact bank controlled by relay 52.

The signals obtained from AND gates 34–37 are further utilized in order to determine if the response selected by the student is correct, or wrong, it being understood that the correct answer will be desirably that one which causes indexing of the maximum number of frames on the film, since the sub-instruction items are interposed between the main instructional items.

If track d has at least one clear, bright spot, the photosensitive cell 24 is excited and provides at its output 54 a voltage which opens AND gate 55 simultaneously, and gates 56, 57 are blocked since voltage from cell 24 is applied to inverse inputs of AND gates 56, 57. If the track d is completely opaque, but track c carries at least one bright spot, then no voltage will appear on line 54, and AND gate 55 will be blocked, but AND gate 56 will provide an output to enable AND gate 58. Similarly, if both tracks c and d are opaque, but track b carries at least one transparent spot, then only the circuit 59 will be enabled. Condensers in parallel to the inputs of the AND gates 55, 58, 59 act as charge storage devices to prevent modification of the state of the gates during the brief moment of blocking of the bright spots by the mask. In the case of example of FIG. 1, the correct answer will always be represented by a bright spot on the track d. If the student correctly identifies spot 7 (FIG. 1) on the response item, AND gate 55 will be the only one which is enabled. By correctly responding, a pulse will also be obtained from AND gate 37 upon scanning by the mask. The AND gate 37, together with the enabling of line 54 will enable circuit 55, a pulse will be transmitted to OR gate 60 to be applied to AND gate 61 and the inverse input to AND gate 64. Since an output will be obtained from OR gate 43, AND gate 61 will be enabled providing an output to counter 62, which counts the correct answers, and further enabling an indicator 63 indicating the correct answers.

If the student had answered incorrectly, for example by placing the photosensitive end 29 against the luminous spot 5, the pulse from circuit 36 cannot enable AND gate 58, so that circuit 61 will remain disabled. Circuit 64 will, however, be enabled since a pulse from OR gate 43 will be accepted, causing the "wrong" counter 65 to step by one count and causing the "wrong" indicator 66 to light.

Figure 7:
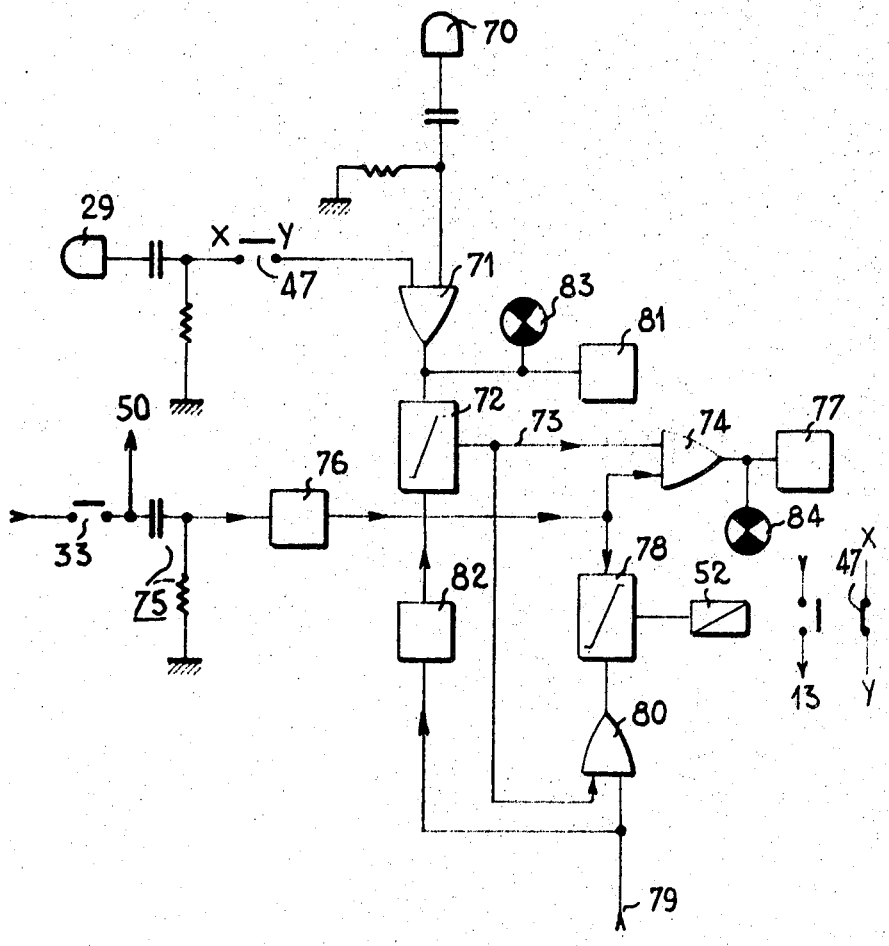
FIG. 7 is a schematic circuit diagram of a different embodiment of the logic circuit.

If the instructional material can be so arranged that only a single sub-item is interspersed between main instruction items, then the signals can be processed in a simplified circuit; referring now to FIG. 7, which illustrates a simplified variation of the logic circuit of FIG. 6: if the answer supplied by the student is wrong then pulses from the photosensitive end 29, and the single photocell 70 which is required to scan the response track will not occur simultaneously, and no pulse will be obtained from the output of AND gate 71. Flipflop 72 will remain in its initial state of ZERO and will supply at its output 73 and unblocking voltage to the AND gate 74. Upon closing of contact 33, which starts scanning of the mask, the differentiating circuit 75 will have a pulse applied thereto which is transmitted by a delay circuit 76. The delay introduced by circuit 76 is slightly greater than the duration of the scanning of the mask. The pulse from circuit 76 will be applied to AND gate 74 which, now, will open and cause the "wrong" counter 77 to increase by one count, simultaneously indicating the wrong answer on indicator 84. At the same time, the flipflop 78 will change to state one, relay 52 will start and cause operation of the motor to index the film. As previously indicated, opening of contact 47 prevents spurious pulses, and the application of spurious signals to AND gate 71. As soon as the film has indexed by one frame, a pulse is supplied over line 79 by the film advance mechanism, which opens AND gate 80, enabled additionally by the output from line 73 of flipflop 72, which, in turn, resets flipflop 78 to stop the motor by dropping out relay 52. The projector thus will present the single sub-instructional item giving additional explanations to the student to lead him to the correct answer.

If the student had initially responded with the correct answer, the pulses from photocells 29 and 70 would have arrived at circuit 71 in coincidence. Output from circuit 71 will have caused the correct" counter 81 to step by one count, simultaneously indicating the correct answer on the indicator 83. Additionally, flipflop 72 would change to state one, causing a potential on line 73 to disappear and block AND gate 74. Thus, when a pulse is obtained over the delay line 76, the AND gate 74 cannot be enabled and the "wrong" counter remains unaffected. As previously indicated, pulses from delay element 76 do, however, change the state of flipflop 78. Relay 52 will thus pull in and cause motor 13 to start. At the subsequent image, the pulse on line 79 by the mechanical transport will, however, find AND gate 80 blocked since there is no output on line 73 from flipflop 72. Thus, flipflop 78 will remain in the state of ONE, and motor 13 will continue to run.

The output pulse from line 79, controlled by the indexing mechanism of the film advance is applied additionally to a delay element 82 and will have just stopped when the flipflop 79 passes again to state ZERO, in order to open AND gate 80. Passage of the film will continue until the second frame is presented. At that moment, a pulse from line 79 now will find AND gate enabled over line 73, causing dropout of the relay 52 and stopping of the motor. Thus, upon supplying the correct answer, two frames of the film run before the film again stops.

Various changes and modifications are possible, and only two specific examples have been described. Specifically, the logic circuit and the relay may be replaced by other similar elements having similar functions. The tracks a, b, c, d and the photosensitive cells with which they are associated may be located at any desired place on the frame of a picture. They may, for example, not be arranged in horizontal alignment but rather in longitudinal alignment between consecutive images, the scanning of the mask 12 then being done transversely, rather than longitudinally, with respect to movement of the film, the spots 5–8 being themselves spaced transversely with respect to each other, rather than longitudinally. The response of the student will thus be, with respect to a specific point on the abscissa, rather than with respect to the ordinate, considering each frame itself as a set of points in orthogonal coordinates.

The mask itself may be formed of two movable masking elements, one moving in a horizontal direction and the other transversely, with respect to the longitudinal extent of the film, so that the response code tracks, and the position of the photosensitive end of the pointer can be combined in two directions, to enable identification of the response of the student by designation on the screen of a specific coordinate point, and not only by a horizontal, or vertical location within a frame.

The optical ribbon may be located adjacent the film on the tracks a, b, c, d; this is not necessary, and the photosensitive elements may be placed adjacent the screen 19 and in light receiving relationship with the images of the response code tracks. This solution is particularly desirable for small size film, and enables use of much larger reading elements, since they will respond to an enlarged image. This advantage is, obtained only at the cost of diffusion of the light on the screen and possible decrease of difference between brightness and darkness, as the mask passes over the frame during scanning. The mask, itself, can move parallel any direction, or in the form of a rotating shutter having a slotted blade moving in a plane parallel to the film plane. In the arrangement, the bright spots such as spots 5 and 5a will then be aligned not along a transverse line, but rather along a similar radius with respect to the center of rotation of the rotating shutter. The mask itself may be a rod, any kind of blocking element, or a blade, such as a shutter blade having a width equal to that of a projected light spot, or larger.

The fixed photocells 21–24 may be replaced by movable cells, connected for movement conjointly with the mask 12, and responding to the width only of the bright spots 5a–8a. Upon scanning by the mask, coincidence between the abrupt decrease in luminous flux obtained from the photosensitive end 29 and the abrupt increase of light flux obtained from the respective photosensitive element 21–24 is detected. Thus, the particular track carrying a bright spot is identified with respect to the specific answer indicated by the student.

The optical system has been described essentially in connection with bright light falling on photosensitive elements; the system may be reversed, and tracks may be transparent on which opaque spots are formed, coincidence between decrease of light sensed at any point by the pointer of the student and, on the other hand, by the photosensitive cell associated with the response code tracks can then be detected.

In accordance with another variation, sub-instructional items need not be placed longitudinally, that is interspersed with main instructional items on the film, but can be placed rather at the side of corresponding main item. The sub-items are then presented, for example, not by indexing of the film but rather by unblocking portions of a frame, previously masked to the student by means of a movable mask arranged to selectively permit presentation of sub-items, as desired. Of course, all sub-items could be projected simultaneously with directions to the student to first answer a group of questions which, if correctly answered, will cause indexing of the film to the next main item or, if incorrectly answered, will remain exposed to the student for further consideration and study until a next answer is given or until a predetermined time has elapsed. Various other changes and modifications, within the inventive concept, may be made as desired by the teachine program to be presented.

I claim:

1. Teaching machine comprising an image projector projecting sequential images of a strip of film on a screen, said film strip carrying instruction items (4) and response items (5–8), at least one response item representing a correct answer, and further carrying at least one response code track (a, b, c, d), said at least one code track having a first optical density, and spots of substantially different optical density placed in coded position on said at least one track at predetermined position on the film, the position of said spots on the film being associated with previously selected response items, the correct answer being represented by a selected spot on a predetermined track, the spot associated with a response item at said predetermined track being positioned on the film in predetermined relation with the correct response item;

a pointer (FIG. 5) adapted to be manipulated by a student to indicate a selected response item, said pointer having a photosensitive end responsive to light values associated with the response item;

movable masking means (12) movable (50) to scan across at least the response code track and the response items, the mask associating light values of the spot at a predetermined track with the correct response item;

means (32, 33) starting the scanning of said masking means (12);

at least one optical-electrical transducer means (21–24) located in light-receiving relation with respect to said at least one response code track;

and logic means (FIG. 6) coupled to said transducer means and to said photosensitive end (29) of the pointer and detecting coincidence between change in light values of the photosensitive end of the pointer and a specific transducer means associated with a specific track upon movement of said mask.

2. Machine according to claim 1 including means indexing the film strip by one or more frames;

a plurality of coded tracks and an associated transducer means being provided;

wherein the logic circuit controls the indexing of the film strip by a predetermined number of frames in dependence on detection of coincidence of change of light value at the photosensitive end of the pointer and at the transducer means associated with the tracks, each track having assigned thereto a predetermined number of frames being indexed.

3. Machine according to claim 2 answer is represented by a spot on a predetermined code track, and a spot at the predetermined track is aligned, on the film, with respect to movement of the mask with a corresponding response item;

wherein the predetermined answer corresponds to the maximum number of frames being indexed.

4. Machine according to claim 2 including circuit means controlled by said photosensitive end of the pointer controlling the indexing of the film in accordance with the number of frames commanded by said logic circuit.

5. Machine according to claim 1 wherein the spot representing the correct answer is a transparent area on an opaque track;

and the transducer means is located to have a pulse transduced therein upon scanning of said transparent area by said masking means.

6. Machine according to claim 1 wherein the response code track is opaque and the correct answer is represented by a transparent spot on the opaque track;

and said response items are represented by bright spots projected on the screen, the photosensitive end being adapted to respond to the bright spots on the screen upon scanning by said masking means.

7. Machine according to claim 1 wherein the response code track is transparent and the correct answer is represented by an opaque spot on the transparent track;

and said response items are represented by bright spots projected on the screen, the photosensitive end being adapted to respond to the bright spots on the screen upon scanning by said masking means.

8. Machine according to claim 1 wherein said mask is an opaque element at least slightly wider than the spots to blank the spots upon scanning of the masking means for short instances of time to provide output pulses to said transducer means, said pulses being applied to said logic means.

9. Machine according to claim 1 wherein said logic means includes a group of AND gates having one input connected to said photosensitive end and another input connected to respective transducer means associated with a respective response code track.

10. Machine according to claim 1 including means indexing the film strip by one or more frames, and wherein the logic means includes a preset counter (42) the output of said counter controlling the number of frames being indexed in accordance with sensed coincidence between the outputs from said photosensitive end and the transducer means, said indexing means stopping the film after a selected number of frames, as determined by the counter, have been indexed.

11. Machine according to claim 1 including means indexing the film strip by one or more frames, wherein the film carries main instruction items and sub-instruction items and the indexing means indexes said film under control of said logic circuit to present a selected sub-instruction item, or the next main instruction item, in accordance with the answer given by the student as indicated by presenting the photosensitive end to a selected response item.

12. Machine according to claim 1 including means indexing the film strip by one or two frames, said film carrying, in alternate sequence, sub-instruction items and main instruction items, the film having a single response code track, the correct answer being indicated by a spot of differential optical transmissivity in a predetermined position on said code track.

13. Teaching machine comprising an image projector projecting an image having instruction items, response items and at least one response code track thereon, said instruction items and said response items being projected on a screen;

said response items being represented by zones of differential light flux with respect to the surrounding area of the film and said response code track having spots of differential light transmissivity;

first photosensitive means adapted to be placed in light receiving relation with respect to said zones;

second photosensitive means adapted to be placed in light receiving relation with respect to said spots;

movable masking means sequentially masking selected response items and spots; and a logic circuit means connected to said first photosensitive means and to said second photosensitive means and detecting coincident pulses from said first and said second photosensitive means and controlling subsequent projection of images.

14. Machine according to claim 13 wherein said first photosensitive means is a photosensitive end of a pointer adapted to be placed by a student at a selected zone; film transport means are provided;

and the number of frames transported by said film transport means is determined by said logic circuit by decoding of detected coincidence of pulses from said photosensitive end and the pulse from said second photosensitive means responsive to light from a particular spot.

* * * * *